(12) United States Patent
Nagata et al.

(10) Patent No.: US 10,454,345 B2
(45) Date of Patent: Oct. 22, 2019

(54) LINEAR MOTOR DEVICE

(71) Applicant: FUJI CORPORATION, Chiryu (JP)

(72) Inventors: Ryo Nagata, Okazaki (JP); Takashi Kido, Kariya (JP); Yoshihiro Shirakawa, Gamagori (JP); Masaki Kurono, Anjo (JP)

(73) Assignee: FUJI CORPORATION, Chiryu (JP)

( * ) Notice: Subject to any disclaimer, the term of this patent is extended or adjusted under 35 U.S.C. 154(b) by 541 days.

(21) Appl. No.: 15/038,637

(22) PCT Filed: Dec. 20, 2013

(86) PCT No.: PCT/JP2013/084304
§ 371 (c)(1),
(2) Date: May 23, 2016

(87) PCT Pub. No.: WO2015/092922
PCT Pub. Date: Jun. 25, 2015

(65) Prior Publication Data
US 2016/0301287 A1 Oct. 13, 2016

(51) Int. Cl.
*H02K 11/01* (2016.01)
*H02K 41/03* (2006.01)
(Continued)

(52) U.S. Cl.
CPC ............... *H02K 11/01* (2016.01); *H02K 1/02* (2013.01); *H02K 1/12* (2013.01); *H02K 1/34* (2013.01);
(Continued)

(58) Field of Classification Search
CPC .. H02K 1/02; H02K 1/12; H02K 1/34; H02K 11/01; H02K 41/02; H02K 41/031; H02K 9/00; H02K 9/04
(Continued)

(56) References Cited

U.S. PATENT DOCUMENTS 5,023,495 A * 6/1991 Ohsaka ............... H02K 41/031
310/12.15
6,008,552 A * 12/1999 Yagoto ............... H02K 41/031
310/12.14
(Continued)

FOREIGN PATENT DOCUMENTS

JP 10-201216 A 7/1998
JP 2008-206335 A 9/2008
(Continued)

OTHER PUBLICATIONS

Merriam Webster dictionary definition for "square".*
(Continued)

*Primary Examiner* — Julio C. Gonzalez
*Assistant Examiner* — Ahmed Elnakib
(74) *Attorney, Agent, or Firm* — Oblon, McClelland, Maier & Neustadt, L.L.P.

(57) ABSTRACT

A linear motor device comprising: a path member including a magnet extending in a movement direction; and a moving body including a coil that is movably mounted on the path member; the linear motor device generates thrust in the movement direction between the magnet and the coil by current being passed through the coil; the moving body further includes a magnetic shielding target object, and a magnetic shielding member formed from strongly magnetic material that shields the magnetic shielding target. The magnetic shielding member includes a parallel shielding plate provided parallel to the movement direction between the magnetic shielding target object and the magnet, and a perpendicular shielding plate provided extending away from the magnet in a direction perpendicular to the movement direction at at least one of a front edge and a rear edge of the parallel shielding plate in the movement direction.

8 Claims, 6 Drawing Sheets

(51) Int. Cl.
- *H02K 1/02* (2006.01)
- *H02K 1/12* (2006.01)
- *H02K 1/34* (2006.01)
- *H02K 41/02* (2006.01)
- *H02K 9/00* (2006.01)
- *H02K 9/04* (2006.01)

(52) U.S. Cl.
CPC ........... *H02K 41/02* (2013.01); *H02K 41/031* (2013.01); *H02K 9/00* (2013.01); *H02K 9/04* (2013.01)

(58) Field of Classification Search
USPC ..................................... 310/85, 12.33, 12.29
See application file for complete search history.

(56) References Cited

U.S. PATENT DOCUMENTS

| | | | |
|---|---|---|---|
| 2004/0070285 A1 | 4/2004 | Sogard | |
| 2004/0256930 A1* | 12/2004 | Kim | H02K 7/063 310/81 |
| 2009/0026849 A1 | 1/2009 | Knorr et al. | |
| 2010/0181848 A1* | 7/2010 | Nagasaka | H02K 41/03 310/12.29 |

FOREIGN PATENT DOCUMENTS

| | | |
|---|---|---|
| JP | 2009-529131 A | 8/2009 |
| JP | 2011-193703 | 9/2011 |
| WO | WO 2013/105208 A1 | 5/2015 |

OTHER PUBLICATIONS

Extended European Search Report dated Jul. 4, 2017 in Patent Application No. 13899866.1.

Combined Chinese Office Action and Search Report dated Dec. 29, 2017 in Patent Application No. 201380081719.6 (with partial English translation and English translation of categories of cited documents), 13 pages.

International Search Report dated Feb. 10, 2014, in PCT/JP2013/084304 filed Dec. 20, 2013.

Office Action dated Jul. 25, 2017 in Japanese Patent Application No. 2015-553306 (with unedited computer generated English translation).

* cited by examiner

LINEAR MOTOR DEVICE

TECHNICAL FIELD

The present disclosure relates to a linear motor device with a moving body that moves along a path member by the thrust arising between magnets and a coil through which a current passes, more specifically, it relates to a magnetic shielding structure that mitigates the influence of a magnetic field formed by the magnets.

BACKGROUND ART

Equipment such as solder printers, component mounters, reflow ovens, and board inspection machines is used to produce boards mounted with many electronic components. Conventionally, this equipment is connected via board conveyance devices to form a board production line. In component mounters and board inspection machines, ball screw drive devices have been used as drive devices for mounting heads and inspection heads. In recent years, demands have risen for high speed movement and highly accurate positional control of heads, and linear motor devices have come to be used as drive devices. Of particular note are shaft type linear motor devices, which can produce a large thrust with a limited equipment space.

The present applicant has disclosed an example of this kind of shaft type linear motor device technology in patent literature 1. The cylindrical type linear motor of patent literature 1 is provided with a shaft-shaped stator assembled with a straight line of multiple permanent magnets, and a moving element with multiple in-built coils, and magnetic spacers with a limited thickness dimension are sandwiched between the permanent magnets of the stator. By this, assembly of the stator can be performed with good efficiency while curtailing any drop in thrust.

However, with a conventional linear motor, not just shaft types, when the current flowing through the coil is increased to achieve a large thrust, heat loss increases, and the temperature rises greatly. Thus, forced cooling of the coil is required using, for example, heat dissipation fins or cooling fans. Also, if strong permanent magnets are used to achieve a large thrust, the magnetic field formed by the permanent magnets influences nearby electrical components. Thus, a need arises for magnetic shielding material to mitigate the influence of the magnetic field. Examples of electrical components that require magnetic shielding (magnetic shielding target objects) are electronic control components such as CPUs, and detection sensors that detect using changes in a magnetic field. Technology for magnetic shielding in a linear motor device is disclosed in patent literature 2 and 3.

The paired linear motor of claim 4 of patent literature 2 has a configuration in which a moving element configured from 4N sets of magnet pairs and yokes is surrounded by a magnetic shield. Further, in embodiment 2 of patent literature 2, a configuration is disclosed in which two layers of magnetic shielding are provided such that a larger part of the moving element is surrounded. This is such that magnetic field leakage from the moving element is reduced.

The electric machine of claim 1 of patent literature 3 is provided with a first operating portion, a second operating portion, and a sensor device for detecting the movement amount (relative movement amount) between the two operating portions. Further, the sensor device that responds to stray fields is mounted on one of the operating portions, and a magnetic shielding device is provided between the sensor device and at least one of the operating portions. With claim 2 of patent literature 3, the electric machine is configured as a linear motor, with a first primary portion (moving body) as the first operating portion, and a secondary portion (path member) as the second operating portion. In an embodiment of patent literature 3, the sensor device is mounted on the moving body and is a position detecting sensor that scans a measurement instrument (linear scale) of the path member. Also, the magnetic shielding device is formed of a simple small shielding plate provided between the permanent magnets of the path member and the sensor device of the moving body.

Note that linear motor devices are used not only in component mounters and board inspection machines, but in various industrial machines that have a moving section which moves in a straight line.

CITATION LIST

Patent Literature

Patent Literature 1: JP-A-2008-206335
Patent Literature 2: JP-A-2011-193703
Patent Literature 3: JP-A-2009-529131

SUMMARY

Note that, with the electromagnetic shield of the paired linear motor of patent literature 2, it is good that magnetic field leakage from the moving element (moving body) is reduced while mitigating the influence of the magnetic field on other devices. However, the magnetic shield cannot magnetically shield electrical components that are provided on the moving element. Thus, the problem of electrical components on the moving element being influenced by the magnetic field of magnet pairs, and thereby ceasing to function, malfunctioning, or suffering worsened accuracy, is not solved.

With respect to this, the small shielding plate disclosed in patent literature 2 magnetically shields the sensor device of the moving body from the permanent magnets of the path member. However, when using permanent magnets with a strong magnetic field in order to achieve a large thrust, it is difficult to achieve a sufficient magnetic shielding effect with a small shielding plate, and the problem of the sensor device being influenced by the magnetic field is not solved. As a countermeasure to this, the magnetic shield effect is increased if the surface area of the shielding plate is increased enough. However, because the shielding plate is formed from strongly magnetic material such as iron, there is a strong magnetic attraction to the shielding plate from the permanent magnets. This magnetic attraction intersects the movement direction of the moving body and increases based on the surface area of the shielding plate, thus it impedes the smooth movement of the moving body.

The present disclosure takes account of the above problems and an object thereof is to provide a linear motor device that improves with respect to conventional technology the magnetic shielding effect to a magnetic shielding target object from a magnetic field formed by a magnet, while curtailing the magnetic attraction from the magnet that impedes the smooth movement of a moving body, by using a magnetic shielding member.

To solve the above problems, the present disclosure of a linear motor is a linear motor device comprising: a path member extending in a movement direction and including one of a coil and a magnet; and a moving body including the other of the magnet and the coil, that is movably mounted on the path member; wherein the linear motor device generates thrust in the movement direction between the magnet and the coil by current being passed through the coil, the moving body or the path member including the coil further includes a magnetic shielding target object that requires mitigation from the influence of a magnetic field formed by the magnet, and a magnetic shielding member formed from strongly magnetic material that shields the magnetic shielding target, and the magnetic shielding member includes a parallel shielding plate provided parallel to the movement direction between the magnetic shielding target object and the magnet, and a perpendicular shielding plate provided extending away from the magnet in a direction perpendicular to the movement direction at at least one of a front edge and a rear edge of the parallel shielding plate in the movement direction.

EFFECTS

According to this, a magnetic shielding target object and a magnetic shielding member are provided on a moving body or path member including the coil, and the magnetic shielding member, which shields the magnetic shielding target object from a magnetic field formed by a magnet, includes a parallel shielding plate and a perpendicular shielding plate. In contrast, conventional technology linear motor devices are either not provided with a magnetic shielding member, or are only provided with a parallel magnetic shielding plate. Thus, according to the present disclosure, a portion of a magnetic force line, which reaches a magnetic shielding target object when using conventional technology, is effectively shielded by the perpendicular shielding plate and the parallel shielding plate such that it does not reach the magnetic shielding target object, thereby improving the magnetic shielding effect.

Also, a strong magnetic attraction force is imparted from a magnet on a magnetic shielding member formed from a strongly magnetic material such as iron. As with conventional technology, in a case in which the surface area of the parallel shielding plate is increased in order to increase the magnetic shielding effect, the magnetic attraction force increases based on the surface area. In contrast, with the present disclosure, a perpendicular shielding plate is provided connected to at least one of the front edge and rear edge of the parallel shielding plate extending away from the magnet. Accordingly, with the present disclosure, even if the surface area of the magnetic shielding member is increased, compared to conventional technology, an increase in the magnetic attraction power is curtailed by the amount that the perpendicular shielding plate extends from the magnet. Thus, with the present disclosure, smooth movement of the moving body is not impeded by the magnetic attraction force.

DESCRIPTION OF EMBODIMENTS

Figure 1:
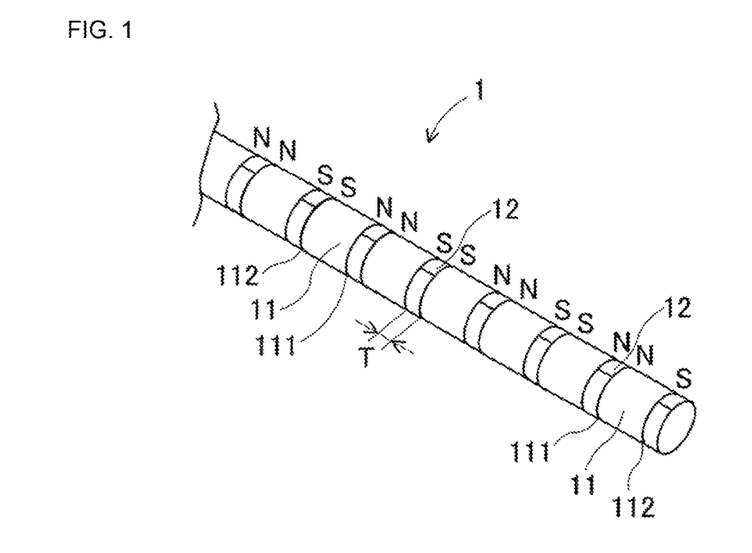
FIG. 1 is a perspective view showing the shaft-type path member which configures an embodiment of the linear motor.
Figure 2:
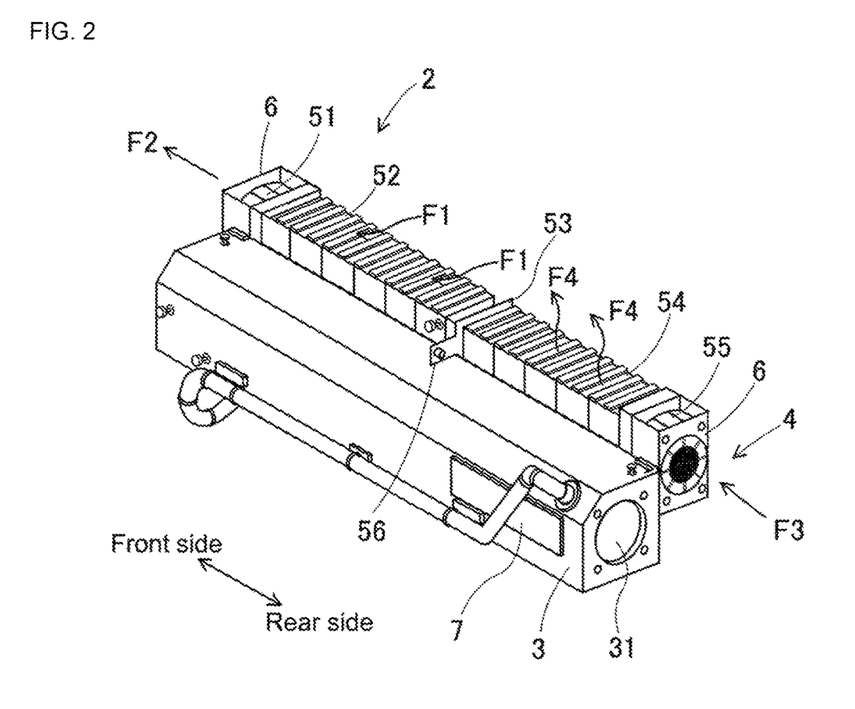
FIG. 2 is a perspective view showing the tubular moving body which configures an embodiment of the linear motor.

An embodiment of the linear motor device according to the present disclosures described below with reference to FIGS. 1 to 15. The embodiment of the linear motor device is configured from shaft-type path member 1 and tubular moving body 2. FIG. 1 is a perspective view showing the shaft-type path member which configures an embodiment of the linear motor. Shaft-type path member 1 is formed from multiple permanent magnets 11 lined up in a movement direction. FIG. 2 is a perspective view showing tubular moving body 2 which configures an embodiment of the linear motor. Tubular moving body 2 includes inner tube section 31 into which shaft-type path member 1 is inserted, and is movably mounted on shaft-type path member 1. Tubular moving body 2 moves back and forth from the near right side to the far left side of FIG. 2. For convenience, the far left side is referred to as the front side, and the near right side is referred to as the rear side.

As shown in FIG. 1, shaft-type path member 1 is configured from multiple permanent magnets 11, multiple magnetic body spacers 12, and a pipe member which is not shown. The pipe member is formed from non-magnetic material and is a long, narrow, tubular member extending in the movement range of tubular moving body 2. The space inside the pipe member houses multiple permanent magnets 11 and multiple magnetic body spacers 12 alternating and contacting each other in the movement direction.

Permanent magnets 11 are formed from strongly magnetic material into a columnar shape with an outer diameter just smaller than the inside diameter of the pipe member. Upper bottom surface 111 of columnar permanent magnets 11 forms an N pole, and lower bottom surface 112 forms an S pole. Magnetic body spacers 12 are formed from strongly magnetic material into a disk-shaped plate with a thickness dimension T and substantially the same outside diameter as permanent magnets 11. The method for deciding thickness dimension T of the magnetic body spacers has been disclosed in patent literature 1, so detailed descriptions are omitted here. Permanent magnets 11 that sandwich magnetic body spacers 12 are arranged such that the poles of the magnets face a pole of the same type (S and N shown in FIG. 1). The multiple permanent magnets 11 form a permanent magnetic field in the surrounding space regardless of the presence or absence of a pipe member.

As shown in FIG. 2, tubular moving body 2 is configured from tubular main body unit 3 and cooling unit 4. Tubular main body unit 3 has an external shape of an approximate cuboid which is long in the movement direction, and inner tube section 31 is formed running through tubular main body unit 3 in the movement direction. In detail, a cross section of tubular main body unit 3 perpendicular to the movement direction is a five-sided shape formed from a substantially square shape with a diagonal slope cut at one corner, and inner tube section 31 is formed in the center of tubular main body unit 3. Tubular main body unit 3 includes eleven coils lined up in the movement direction. Each coil is circumferentially wound around shaft-type path member 1 and is embedded inside tubular main body unit 3.

Tubular moving body 2 is equipped with a position detection section, a movement control section, and a power source section, which are not shown. The position detection section detects the current position of tubular moving body 2 on shaft-type path member 1. The movement control section controls the change in direction and size of the current flowing through the coils from the power source section based on the detected current position and movement commands. Thus, thrust arises in the movement direction between the electric current magnetic field formed by the coils of tubular moving body 2 and the permanent magnetic field formed by permanent magnets 11 of shaft-type path member 1. Because a large current is flowed through the coils in order to achieve a large thrust, the coils must be forcibly cooled. Also, the power source section supplies electric power to cooling fans 51 and 55, which are described later.

Cooling unit 4 is attached to a side surface of tubular main body unit 3. That is, cooling unit 4 is provided within a specified angle range in a circumferential direction of tubular moving body 2. Cooling unit 4 has an external shape of an approximate cuboid which is long in the movement direction. The length dimension of cooling unit 4 in the movement direction roughly matches the length of tubular main body unit 3, and the width dimension of cooling unit 4 perpendicular to the movement direction is smaller than the tubular main body unit 3. Cooling unit 4 is configured from, lined up in order from the front side to the rear side, front cooling fan 51, six sets of front side heat dissipation fins 52, dividing plate 53, five sets of rear side heat dissipation fins 54, and rear side cooling fan 55.

The six sets of front side heat dissipation fins 52 and the five sets of rear side heat dissipation fins 54 are provided facing the coil inside tubular main body unit 3. Each heat dissipation fin 52 and 54 is formed from a material with high thermal conductivity, such as aluminum. One side of heat dissipation fins 52 and 54 is close to the coil or contacts the coil via a heat conduction insulator, and the other side is provided away from the coil. Heat dissipation fins 52 and 54 allow air to flow in the movement direction (the direction linking the front side and the rear side) and are provided to allow air to enter and exit from above. Heat dissipation fins 52 and 54 receive lost heat generated by the coil and dissipate the heat into the air.

Front side cooling fan 51 sucks in air from front side heat dissipation fins 52 and expels the air to the front. Air for cooling is taken into front side heat dissipation fins 52 from above (arrows F1 in FIG. 2) and, after flowing through the inside, is expelled to the front side from front side cooling fan 51 (arrow F2 in FIG. 2). Rear side cooling fan 55 sucks in air for cooling from the rear (arrow F3 in FIG. 2) and expels the air towards rear side heat dissipation fins 54. After flowing inside rear side heat dissipation fins 54, air is expelled upwards (arrows F4 in FIG. 2). By using a forced cooling method in which air is flowed to heat dissipation fins 52 and 54, the heat dissipation effectiveness is improved compare to a natural cooling method. Dividing plate 53 blocks air from flowing between front side heat dissipation fins 52 and rear side heat dissipation fins 54. Also, cooling unit 4 is attached to tubular main body unit 3 by the screw of attachment section 56 that is provided on dividing plate 53.

Front side cooling fan 51 and rear side cooling fan 55 are provided with an in-build control board for controlling rotation of the fan and a Hall sensor for sensing the rotation of the fan. Because the Hall sensor is a detection type sensor that uses a change in a magnetic field, there is a problem in that the sensor may malfunction or suffer from deteriorated accuracy due to the influence of the permanent magnetic field formed by permanent magnets 11. Accordingly, front side cooling fan 51 and rear side cooling fan 55 correspond to the magnetic shielding target object of the present disclosure that requires mitigation of the influence of the permanent magnetic field. To mitigate the influence of the permanent magnetic field, magnetic shielding member 6 is provided around each of front side cooling fan 51 and rear side cooling fan 55. Note that the magnetic shielding target object is not limited to cooling fans 51 and 55. For example, electronic control components such as the movement control section and the position detection section of tubular moving body 2 described above may correspond to the magnetic shielding target object.

Figure 3:
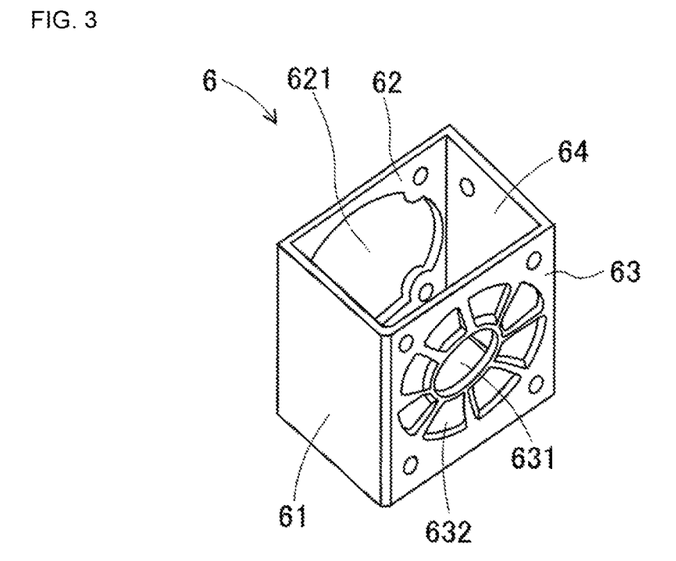
FIG. 3 is a perspective view of the magnetic shielding member that shields a rear side cooling fan that is a magnetic shielding target object from a permanent magnetic field.

The two magnetic shielding members 6 provided around front side cooling fan 51 and rear side cooling fan 55 have forms that are reflectively symmetrical (a mirror image) to each other. Magnetic shielding member 6 of rear side cooling fan 55 is described below as an example. FIG. 3 is a perspective view of magnetic shielding member 6 that shields rear side cooling fan 55 that is a magnetic shielding target object from the permanent magnetic field. Magnetic shielding member 6, described in detail below, is formed in a substantially cuboid box shape which is open at the top.

Magnetic shielding member 6 is formed from an approximately rectangular bottom plate, parallel shielding plate 61, front side perpendicular shielding plate 62, rear side perpendicular shielding plate 63, and outside parallel shielding plate 64 respectively provided extending from the four edges of the bottom plate. Parallel shielding plate 61 is provided parallel to the movement direction between rear side cooling fan 55 and permanent magnets 11 (positioned at the front left in FIG. 3). Front side perpendicular shielding plate 62 is connected to the front edge of parallel shielding plate 51 in the movement direction, and extends in a direction away from permanent magnets 11 perpendicular with respect to the movement direction. Rear side perpendicular shielding plate 63 is connected to the front edge of parallel shielding plate 61 in the movement direction, and extends in a direction away from permanent magnets 11 perpendicular with respect to the movement direction. Outside parallel shielding plate 64 is provided connecting front side perpendicular shielding plate 62 and the edge of rear side perpendicular shielding plate 63 separated from permanent magnets 11. Also, rear side cooling fan 55 is fixed on the bottom plate. Accordingly, when viewed from above, magnetic shielding member 6 is a rectangle surrounding rear side cooling fan 55.

A large approximately circular hole 621 is formed in front side perpendicular shielding plate 62. A large circular center hole 631 is formed in rear side perpendicular shielding plate 63, and eight small surrounding holes 632 are formed around center hole 631. These holes 621, 631, and 632 mean that the inflow and outflow of air to and from rear side cooling fan 55 is not obstructed.

Magnetic shielding member 6 may be manufactured by a method such as press punching or bending a plate made of strongly magnetic material such as soft iron. However, magnetic shielding member 6 may be made from a strongly magnetic material other than soft iron, and the manufacturing method is not particularly restricted.

Figure 4:
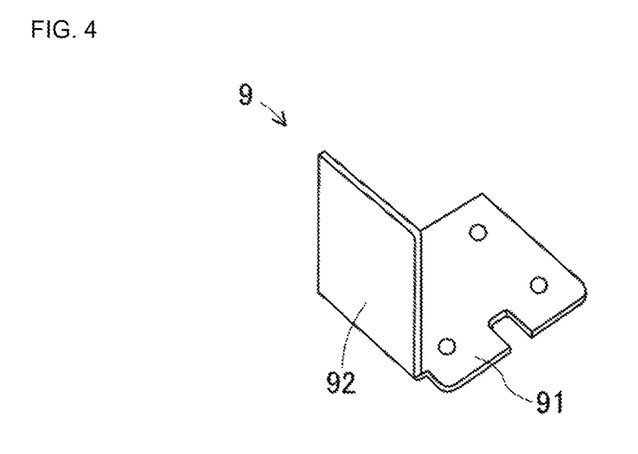
FIG. 4 is a perspective view of a conventional technology attachment member for attaching a rear side cooling fan.

For reference, FIG. 4 is a perspective view of a conventional technology attachment member for attaching rear side cooling fan 55. Conventional technology attachment member 9 is formed in an L-shape when viewed from the front from approximately rectangular bottom plate 91, and rectangular parallel shielding plate 92 is provided at one edge of bottom plate 91.

As shown in FIG. 2, tubular main body unit 3 further includes magnetic force canceling member 7. Magnetic force canceling member 7 is formed, for example, as a rectangular plate long in the movement direction from a strongly magnetic material such as soft iron. Magnetic force canceling member 7 is provided on the other side of tubular main body unit 3. That is, magnetic force canceling member 7 is provided at an angle range on the opposite side to the specified angle range in the circumferential direction of tubular moving body 2 at which cooling unit 4 is provided. Specifically, magnetic force canceling member 7 is provided at a position substantially corresponding to rear side cooling fan 55 centered around tubular main body unit 3.

Magnetic force canceling member 7 is a member for canceling the magnetic attraction force of permanent magnets 11 that attracts magnetic shielding member 6. Here, it is clear that the magnetic attraction force is canceled if a dummy member with the same material properties and the same form as magnetic shielding member 6 is manufactured and positioned at a position corresponding to magnetic shielding member 6. This is because the magnetic attraction of permanent magnets 11 that attracts magnetic shielding member 6 is of equal size and opposite direction to the magnetic attraction of permanent magnets 11 that attracts the dummy member. Note that, it is desirable not to make this dummy member much larger than the width dimension of tubular moving body 2.

Due to this, in order to achieve the same effect as with the dummy member with magnetic force canceling member 7 that is a simple plate member, it is desirable to perform magnetic attraction force simulation. Further, it is desirable to perform simulation multiple times using parameters such as the attachment method, position, and size and thickness of the plate member forming magnetic force canceling member 7. By this, the magnetic attraction force is effectively canceled without making tubular moving body 2 larger, and magnetic force canceling member 7 has a suitable plate form with an easy attachment method.

Note that, for FIG. 2, magnetic force canceling member 7 may be provided at a position substantially corresponding to front side cooling fan 51 as well as rear side cooling fan 55. Also, it is also possible to provide only one magnetic force canceling member 7 at a position close to the center position of tubular main body unit 3 in the movement direction. Magnetic force canceling member 7 is not limited to a plate member, and there is a degree of freedom in the attachment method, position, quantity, and form of magnetic force canceling member 7.

Magnetic shielding effects of the linear motor device of the embodiment described above are described below with reference to simulation results. Simulations were performed with three models, a non-shielded model, a parallel shielded model, and a rectangular shielded model. As a shared condition for the three models, modeling was performed with rear side cooling fan 51 positioned directly beside permanent magnet 11. For the modeling, only rear side cooling fan 51, permanent magnets 11, and magnetic shielding members 6B and 6C were considered; other members were taken to have substantially relative permeability of one and were not considered.

Figure 5:
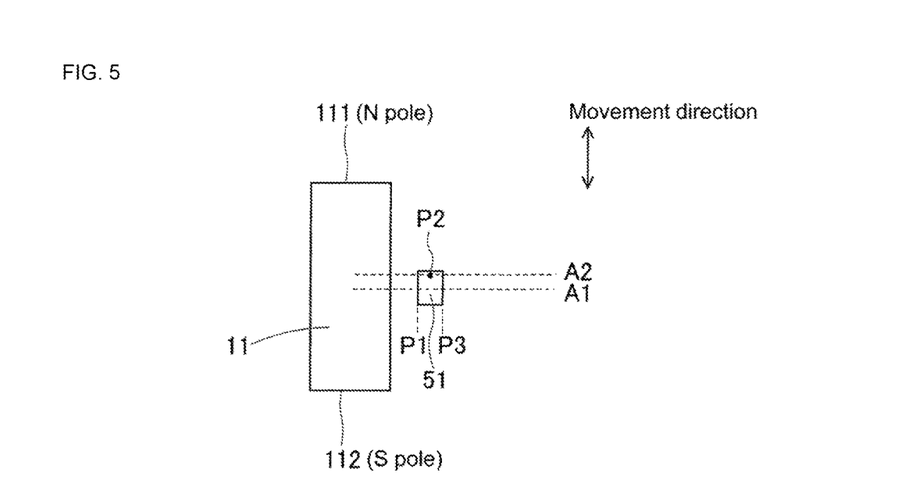
FIG. 5 shows the simulated form of the distribution of magnetic field strength of a non-shielded model under conditions without a magnetic shielding member present.

FIG. 5 shows the simulated form of the distribution of magnetic field strength of a non-shielded model under conditions without a magnetic shielding member present. With the non-shielded model, only front side cooling fan 51 and permanent magnets 11 were considered. The up/down direction of the page surface of FIG. 5 is the movement direction of tubular moving body 2, and the direction on the page surface from the left to the right is the perpendicular outer direction. Also, in the figure, position P1 is a side surface of front side cooling fan 51 close to permanent magnet 11, and position P3 is another side surface of front side cooling fan 51 separated from permanent magnet 11. Further, P2 represents position P2 of a Hall sensor provided at a center position towards the front of front side cooling fan 51. Position P2 is were magnetic force mitigation is most required. Cross section A1 of FIG. 5 is a cross section at the center of front side cooling fan 51. Cross section A2 of FIG. 5 is a cross section at position P2 of the Hall sensor of front side cooling fan 51. Note that, cross section B1 of FIG. 8 and cross section C1 of FIG. 11 described below correspond to the same position as cross section A1, and cross section B2 of FIG. 8 and cross section C2 of FIG. 11 correspond to the same position of cross section A2.

Figure 6:
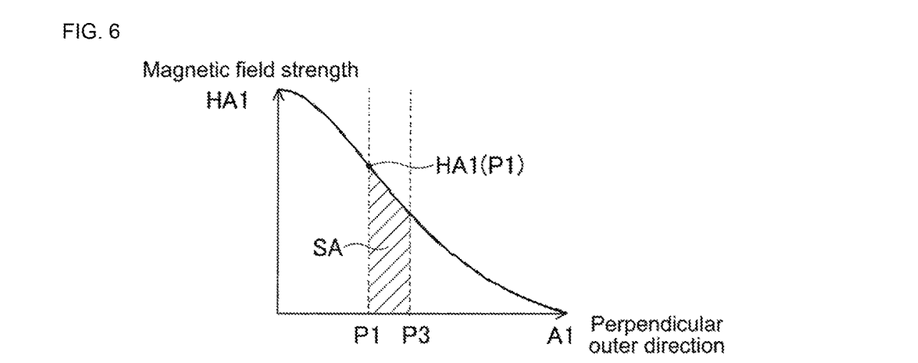
FIG. 6 shows the distribution of magnetic field strength at the cross section A1 of FIG. 5.
Figure 7:
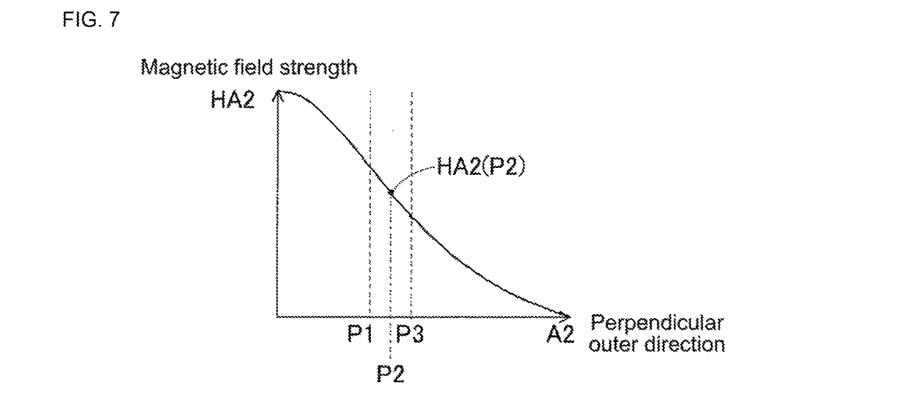
FIG. 7 shows the distribution of magnetic field strength at the cross section A2 of FIG. 5.

Simulation results shown in FIGS. 6 and 7 are obtained with the non-shielded model shown in FIG. 5. FIG. 6 shows the distribution of magnetic field strength HA1 at cross section A1 of FIG. 5; FIG. 7 shows the distribution of magnetic field strength at cross section A2 of FIG. 5. With the non-shielded model that does not consider a magnetic shielding member, because the entire region has a relative permeability of one, a conventional magnetic field of a magnetic dipole is formed. Thus, magnetic field strength HA1 and magnetic field strength HA2 decreases moving in the perpendicular outer direction that increases the distance from the center of permanent magnets 11.

Figure 8:
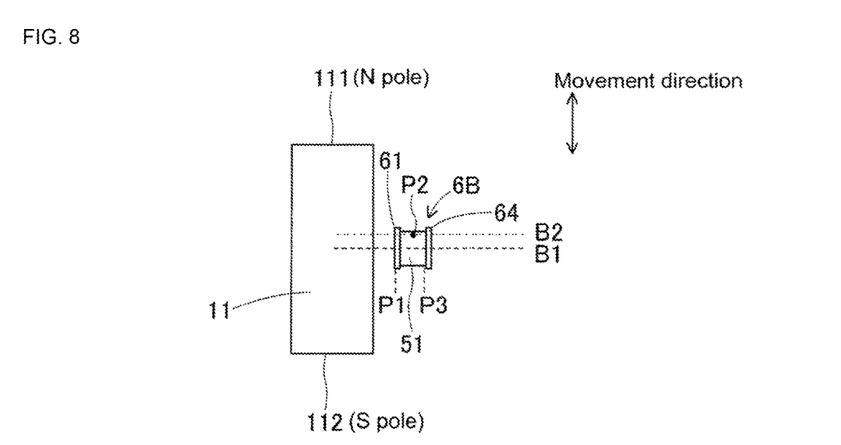
FIG. 8 shows the simulated form of the distribution of magnetic field strength of a parallel shielded model under conditions using a magnetic shielding member formed from a parallel shielding plate and an outside parallel shielding plate.

FIG. 8 shows the simulated form of the distribution of magnetic field strength of a parallel shielded model under conditions using magnetic shielding member 6B formed from parallel shielding plate 61 and outside parallel shielding plate 64. Parallel shielding plate 61 is provided contacting a surface of front side cooling fan 51 (position P1); outside parallel shielding plate 64 is provided contacting another side surface of front side cooling fan 51 (position P3). Simulation results shown in FIGS. 9 and 10 are obtained with the parallel shielded model.

Figure 9:
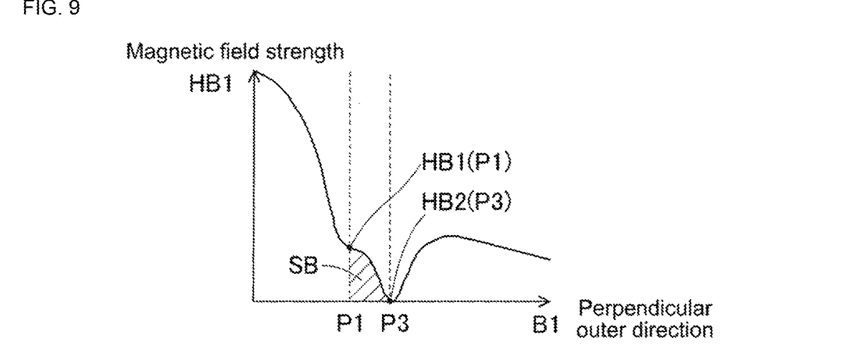
FIG. 9 shows the distribution of magnetic field strength at the cross section B1 of FIG. 8.

FIG. 9 shows the distribution of magnetic field strength HB1 at the cross section B1 of FIG. 8. Magnetic field strength HB1 decreases moving in the perpendicular outer direction from the center of permanent magnets 11. Thus, magnetic field strength HB1 (P1) at position P1 has decreased significantly more than magnetic field strength HA1 (P1) of the non-shielded model shown in FIG. 6. Further, at position P3, magnetic field strength HB1 (P3) is substantially zero.

On the other hand, in the region further separated from position P3 in the perpendicular outer direction, magnetic field strength HB1 is increased more than magnetic field strength HA1 of the non-shielded model. That is, a portion of a magnetic force line that reaches front side cooling fan 51 in the non-shielded model is guided outside of front side cooling fan 51 and prevented from reaching front side cooling fan 51 in the parallel shielded model. As a quantitative evaluation of magnetic shielding, the average value of magnetic field strength HB1 across the width range of front side cooling fan 51 (the range P1 to P3) is decreased down to 32% of the equivalent average value for the non-shielded model. That is, area SB shown by the diagonal lines in FIG. 9 is 32% the size of area SA shown by the diagonal lines in FIG. 6.

Figure 10:
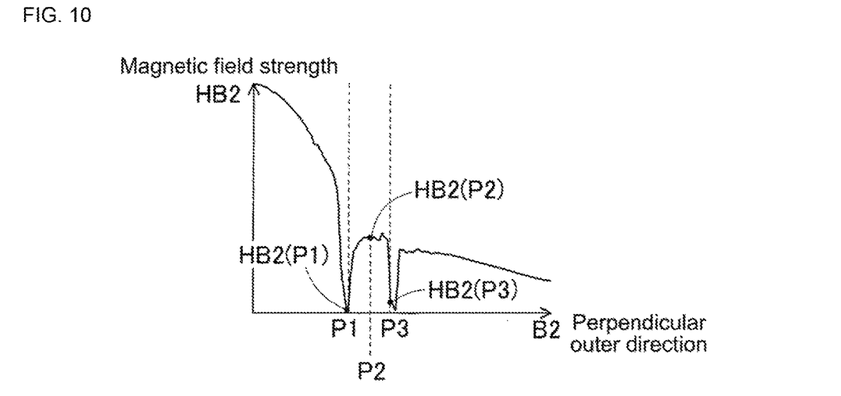
FIG. 10 shows the distribution of magnetic field strength at the cross section B2 of FIG. 8.

FIG. 10 shows the distribution of magnetic field strength HB2 at the cross section B2 of FIG. 8. Magnetic field strength HB2 (P1) at position P1 and magnetic field strength HB2 (P3) at position P3 are substantially zero. Qualitatively, the magnetic shielding effect that arises is the same as for magnetic field strength HB1 at cross section B1. However, magnetic field strength HB2 (P2) at position P2 of the Hall sensor, only decreases to 64% of magnetic field strength HA2 (P2) of the non-shielded model shown in FIG. 7. Accordingly, even though a magnetic shielding effect arises at position P2 of the Hall sensor, it cannot be said to be definitely sufficient in a quantitative sense.

Figure 11:
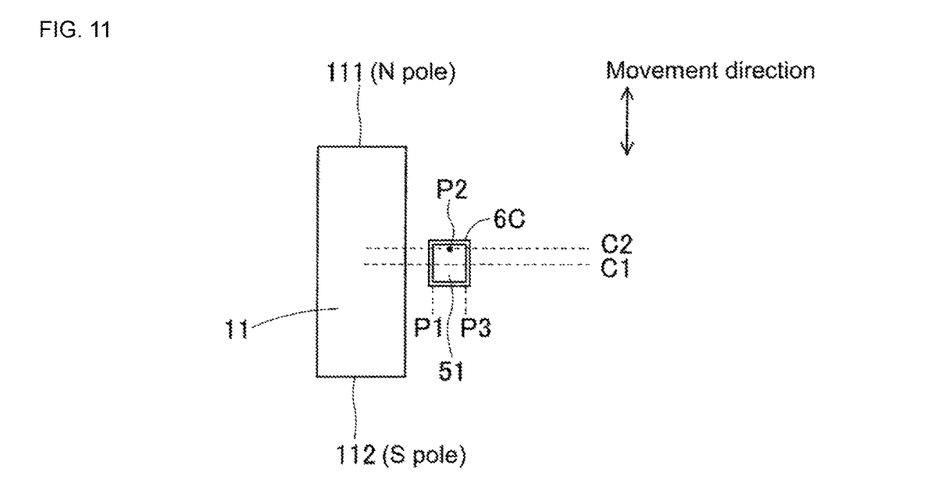
FIG. 11 shows the simulated form of the distribution of magnetic field strength of a rectangular shielded model under conditions using a magnetic shielding member with a rectangular shape when seen from above.

FIG. 11 shows the simulated form of the distribution of magnetic field strength of a rectangular shielded model under conditions using magnetic shielding member 6C with a rectangular shape when seen from above. Magnetic shielding member 6C is provided contacting the four side surfaces of front side cooling fan 51. Simulation results shown in FIGS. 12 and 13 are obtained with the rectangular shielded model shown in FIG. 11.

Figure 12:
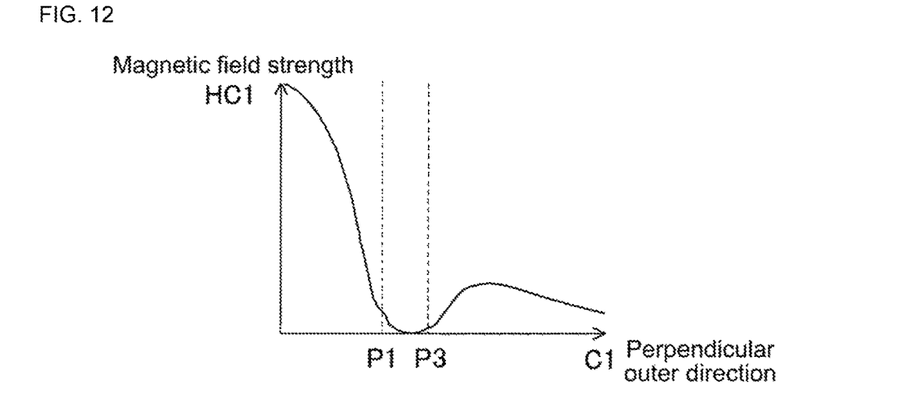
FIG. 12 shows the distribution of magnetic field strength at the cross section C1 of FIG. 11.

FIG. 12 shows the distribution of magnetic field strength HC1 at the cross section C1 of FIG. 11. Magnetic field strength HC1 is extremely small across the width range of front side cooling fan 51 (the range P1 to P3). Further, in the region further separated from position P3 in the perpendicular outer direction, magnetic field strength HC1 is increased more than magnetic field strength HA1 of the non-shielded model. That is, a portion of a magnetic force line that reaches front side cooling fan 51 in the non-shielded model is guided outside of front side cooling fan 51 and prevented from reaching front side cooling fan 51 in the rectangular shielded model.

Figure 13:
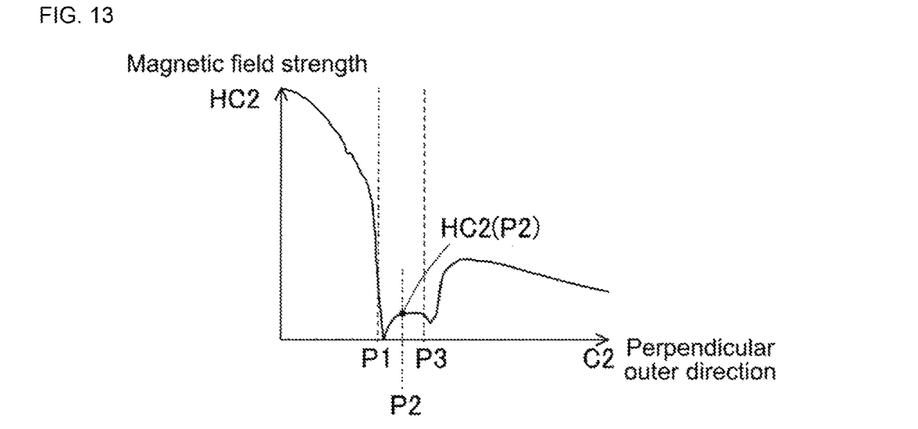
FIG. 13 shows the distribution of magnetic field strength at the cross section C2 of FIG. 11.

FIG. 13 shows the distribution of magnetic field strength HC2 at the cross section C2 of FIG. 11. Magnetic field strength HC2 is small across the width range of front side cooling fan 51 (the range P1 to P3). Further, magnetic field strength HC2 (P2) at position P2 of the Hall sensor decreases to below one-third, that is 32%, of magnetic field strength HA2 (P2) of the non-shielded model shown in FIG. 7. Accordingly, a quantitatively sufficient magnetic shielding effect is achieved at position P2 of the Hall sensor.

Unlike the actual magnetic shielding member 6, rectangular shielding member 6C used in the simulation does not have holes 621, 631, or 632 at positions equivalent to front side perpendicular shielding plate 62 and rear side perpendicular shielding plate 63. Accordingly, although the magnetic shielding effect achieved by the actual magnetic shielding member 6 is slightly less than the effect of the rectangular shielded model, it is reliably better than the effect of the parallel shielded model. This is supported by experiments using an actual magnetic shielding member 6.

Note that, in the present embodiment, the influence of the electric current magnetic field formed by the coil is small compared to the influence of the permanent magnetic field formed by permanent magnets 11, so was ignored in the above simulation. However, even in a case in which the electric current magnetic field is relatively large, magnetic shielding member 6 has a similar magnetic shielding effect with respect to both the electric current magnetic field and the permanent magnetic field.

Figure 14:
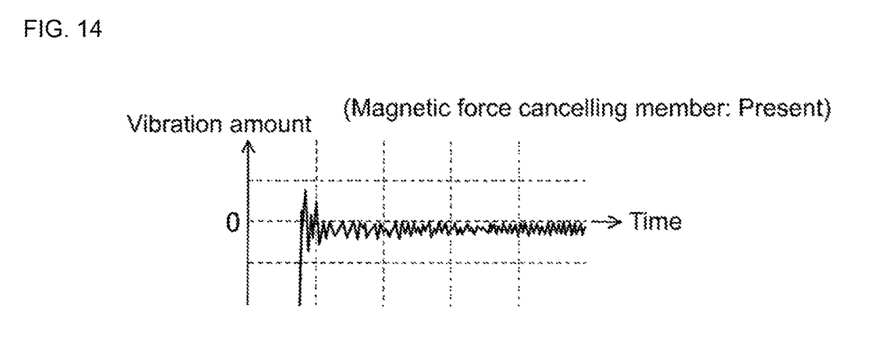
FIG. 14 is a graph of a waveform measuring the rolling vibration amount arising when the tubular moving body moves in an embodiment of the linear motor device.
Figure 15:
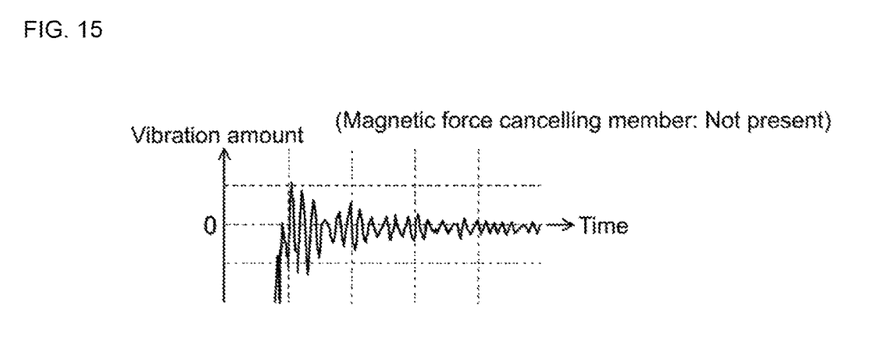
FIG. 15 is a graph of a waveform measuring the rolling vibration amount arising when the tubular moving body moves in an embodiment of the linear motor device from which the magnetic force canceling member has been removed.

Next, the effect of magnetic attraction force canceling of the linear motor device of the present disclosures described with reference to experiment results. FIG. 14 is a graph of a waveform measuring the rolling vibration amount arising when tubular moving body 2 moves in an embodiment of the linear motor device. FIG. 15 is a graph of a waveform measuring the rolling vibration amount arising when tubular moving body 2 moves in an embodiment of the linear motor device from which magnetic force canceling member 7 has been removed. In FIGS. 14 and 15, the horizontal axis indicates time, and the vertical axis indicates the rolling vibration amount perpendicular to the movement direction. Further, the waveforms of FIGS. 14 and 15 were measured with the same scanning time and same measuring range.

The rolling amplitude for the embodiment in FIG. 14 is approximately half the amplitude of that of FIG. 15 for the device with magnetic force canceling member 7 removed. The difference in this amplitude occurs only based on the presence or absence of magnetic force canceling member 7. With the configuration with magnetic force canceling member 7 removed, the magnetic attraction force of permanent magnets 11 that attracts magnetic shielding member 6 changes greatly depending on the positional relationship between tubular moving body 2 and permanent magnets 11. For example, the magnetic attraction force is maximized when magnetic shielding member 6 of tubular moving body 2 is positioned directly beside an N pole or S pole of a permanent magnet 11, and the magnetic attraction force is minimized when magnetic shielding member 6 of tubular moving body 2 is positioned between an N pole and S pole of two permanent magnets 11. By this, a large rolling amount of tubular body 2 arises, which impedes smooth movement.

In contrast, in the configuration of the present embodiment, at least a portion of the magnetic attraction of permanent magnets 11 that attracts magnetic shielding member 6 is canceled by the magnetic attraction of permanent magnets 11 that attracts magnetic force canceling member 7. By this, the net magnetic attraction force in the rolling direction that acts on tubular moving body 2 is reduced, and as a result the rolling amount is reduced to around half that otherwise. Thus, smooth movement of tubular moving body 2 is not impeded.

The linear motor device of the present embodiment includes shaft-type path member 1 including multiple permanent magnets 11 extending in a movement direction, and tubular moving body 2 including a coil movably mounted on shaft-type path member 1; the linear motor device generates thrust in the movement direction between permanent magnets 11 and the coil by current being passed through the coil; also, tubular moving body 2 including the coil further includes cooling fans 51 and 55 (magnetic shielding target objects) that require mitigation from the influence of a magnetic field formed by the permanent magnets, and magnetic shielding member 6 formed from strongly magnetic material that shields cooling fans 51 and 55 from the permanent magnetic field; also, magnetic shielding member 6 includes parallel shielding plate 61 provided parallel to the movement direction between cooling fans 51 and 55 and permanent magnets 11, and front side perpendicular shielding plate 62 and rear side perpendicular shielding plate 63 provided extending away from the permanent magnets in a direction perpendicular to the movement direction at the front edge and the rear edge of parallel shielding plate 61 in the movement direction.

According to this, cooling fans 51 and 55 (magnetic shielding target objects) and magnetic shielding member 6 are provided on tubular moving body 2 including the coil, and magnetic shielding member 6, which shields cooling fans 51 and 55 from a magnetic field formed by permanent magnets 11, includes parallel shielding plate 61 and perpendicular shielding plates 62 and 63. In contrast, conventional technology linear motor devices are either not provided with a magnetic shielding member, or are only provided with a parallel magnetic shielding plate. Thus, according to the present disclosure, a portion of a magnetic force line, which reaches a magnetic shielding target object when using conventional technology, is effectively shielded by parallel shielding plate 61 and perpendicular shielding plates 62 and 63 such that it does not reach cooling fans 51 and 55, thereby improving the magnetic shielding effect.

Also, a strong magnetic attraction force is imparted from permanent magnets 11 on magnetic shielding member 6 formed from a strongly magnetic material such as soft iron. As with conventional technology, in a case in which the surface area of the parallel shielding plate is increased in order to increase the magnetic shielding effect, the magnetic attraction force increases based on the surface area. In contrast, with the present embodiment, perpendicular shielding plates 62 and 63 are provided connected to the front edge and rear edge of parallel shielding plate 61 extending away from permanent magnets 11. Accordingly, with the present embodiment, even if the surface area of the magnetic shielding member is increased, compared to conventional technology, an increase in the magnetic attraction power is curtailed by the amount that perpendicular shielding plate 62 and 63 extend from the magnets. By this, with the present embodiment, smooth movement of tubular moving body 2 is not impeded by the magnetic attraction force.

Further, with the linear motor device of the present embodiment, magnetic shielding member 6 includes parallel shielding plate 61, front side perpendicular shielding plate 62 and rear side perpendicular shielding plate 63 provided at the front edge and rear edge of parallel shielding plate 61 in the movement direction, and outside parallel shielding plate 64 connected to the edges of the two perpendicular shielding plates 62 and 63 which are away from permanent magnets 11, such that cooling fans 51 and 55 (magnetic shielding target objects) are surrounded by rectangles.

Accordingly, at position P2 of a Hall sensor on cooling fans 51 and 55 which may suffer from the influence of the permanent magnetic field, magnetic field strength HC2 (P2) is decreased to around one-third of that compared to a case in which there is no magnetic shielding member 6. In other words, a quantitatively sufficient magnetic shielding effect is achieved at position P2 of the Hall sensor.

Further, with the linear motor device of the present embodiment, the path member is shaft-type path member 1 formed from multiple permanent magnets 11 lined up in the movement direction such that the magnets face a magnet with an opposite pole, and the moving body is tubular moving body 2 including a coil wound circumferentially around shaft-type path member 1.

Accordingly, because a sufficient magnetic shielding effect is achieved even though permanent magnets 11 with a strong magnetic field are used to achieve an appropriately large thrust in the shaft-type linear motor device, no malfunctioning or worsening of detection accuracy occurs with the Hall sensors built into cooling fans 51 and 55.

Further, with the linear motor device of the present embodiment, tubular moving body 2 includes magnetic shielding member 6 and cooling fans 51 and 55 within a specified angle range in the circumferential direction, and magnetic force canceling member 7 formed from a strongly magnetic material outside a specified angle range in the circumferential direction, and at least a portion of the magnetic attraction force that attracts magnetic shielding member 6 to the multiple permanent magnets 11 is canceled by the magnetic attraction force that attracts magnetic force canceling member 6 to the multiple permanent magnets 11.

Accordingly, the net magnetic attraction force in the rolling direction that acts on tubular moving body 2 is reduced, such that the rolling amount is reduced. Thus, smooth movement of tubular moving body 2 is not impeded.

Further, in the linear motor device of the present embodiment, magnetic force canceling member 7 is at an angle range on the opposite side to the specified angle range in the circumferential direction of tubular moving body 2.

Accordingly, by using magnetic force canceling member 7 that is a simple plate member, it is possible to effectively cancel the magnetic attraction force with making tubular moving body 2 larger. Also, the attachment method of magnetic force canceling member 7 is easy.

Further, with the linear motor device of the present embodiment, the magnetic shielding target object is cooling fans 51 and 55 that cool the coil, front side perpendicular shielding plate 62 of magnetic shielding member 6 includes hole 621 through which air for cooling is allowed to flow, and rear side perpendicular shielding plate 63 of magnetic shielding member 6 includes center hole 631 and surrounding holes 632 through which air for cooling is allowed to flow.

Accordingly, by having holes 621, 631, and 632, the inflow and outflow of air to and from cooling fans 51 and 55 is not obstructed.

Note that, in a case in which the magnetic shielding target object is not cooling fans 51 and 55, hole 621 of front side perpendicular shielding plate 62 and center hole 631 and surrounding holes 632 of rear side perpendicular shielding plate 63 are unnecessary. In this case, the magnetic shielding effect will be reliably raised. Further note that, various changes may be made to the configuration of shaft-type path member 1 and tubular moving body 2. Various other applications and modifications are possible for the present disclosure.

The present disclosure of a linear motor device is not limited to a head driving device of a component mounter or board inspection machine, and may be used in various industrial machines that have a moving section which moves in a straight line.

REFERENCE SIGNS LIST

1: shaft-type path member; 11: permanent magnet; 12: magnetic body spacer; 2: tubular moving body; 3: tubular main body unit; 4: cooling unit; 51: front side cooling fan;

52: front side heat dissipation fin; 53: dividing plate; 54: rear side heat dissipation fin; 55: rear side cooling fan; 6: magnetic shielding member; 61: parallel shielding plate; 62: front side perpendicular shielding plate; 63: rear side perpendicular shielding plate; 64: outside perpendicular shielding plate; 6B, 6C: conventional technology attachment member; 7: magnetic force canceling member; 9: conventional technology attachment member; P2: position of Hall sensor built into front side cooling fan; HA1, HA2, HB1, HB2, HC1, HC2: magnetic field strength

The invention claimed is:

1. A linear motor device comprising:
   a path member extending in a movement direction and including one of a magnet and coil; and
   a moving body including the other of the magnet and the coil, that is movably mounted on the path member; wherein
   the linear motor device generates thrust in the movement direction between the magnet and the coil by current being passed through the coil,
   the moving body or the path member including the coil further includes
   a magnetic shielding target object that requires mitigation from the influence of a magnetic field formed by the magnet,
   a magnetic shielding member formed from strongly magnetic material that shields the magnetic shielding target object,
   the magnetic shielding member includes a parallel shielding plate provided parallel to the movement direction and a perpendicular shielding plate provided extending away from the magnet in a direction perpendicular to the movement direction at at least one of a front edge and a rear edge of the parallel shielding plate in the movement direction,
   the parallel shielding plate is provided between the magnetic shielding target object and the magnet so as to block the magnetic shielding target object from directly facing any portion of the magnet in a direction perpendicular to the movement direction, and
   the magnetic shielding target object is a cooling fan that cools the coil, and the perpendicular shielding plate of the magnetic shielding member include holes through which air for cooling is allowed to flow.

2. The linear motor device according to claim 1, wherein the magnetic shielding member includes the parallel shielding plate, two of the perpendicular shielding plates provided at the front edge and the rear edge of the parallel shielding plate in the movement direction, and an outside parallel shielding plate connected to the edges of the two perpendicular shielding plates which are away from the magnet, such that the magnetic shielding target object is surrounded by a rectangle.

3. The linear motor device according to claim 1, wherein the path member is a shaft-type path member formed from multiple of the magnets lined up in the movement direction such that the magnets face a magnet with an opposite pole, and
   the moving body is a tubular body including a coil wound circumferentially around the shaft-type path member.

4. The linear motor device according to claim 3, wherein the tubular moving body includes the magnetic shielding target object and the magnetic shielding member within a specified angle range in the circumferential direction, and a magnetic force canceling member formed from a strongly magnetic material outside a specified angle range in the circumferential direction, and
   at least a portion of the magnetic attraction force that attracts the magnetic shielding member to the multiple magnets is canceled by the magnetic attraction force that attracts the magnetic force canceling member to the multiple magnets.

5. The linear motor device according to claim 4, wherein the magnetic force canceling member is a plate member provided at an angle range on the opposite side to the specified angle range in the circumferential direction of the tubular moving body.

6. The linear motor device according to claim 4, wherein the magnetic force canceling member is on a side of tubular moving body opposite to a side on which the magnetic shielding target object is provided.

7. A linear motor device comprising:
   a path member extending in a movement direction and including one of a magnet and coil; and
   a moving body including the other of the magnet and the coil, that is movably mounted on the path member; wherein
   the linear motor device generates thrust in the movement direction between the magnet and the coil by current being passed through the coil,
   the moving body or the path member including the coil further includes
   a magnetic shielding target object that requires mitigation from the influence of a magnetic field formed by the magnet, and
   a magnetic shielding member formed from strongly magnetic material that shields the magnetic shielding target object,
   the magnetic shielding member includes a first parallel shielding plate parallel to the movement direction between the magnetic shielding target object and the magnet, a second parallel shielding plate parallel to the movement direction on a side of the magnetic shielding object opposite of the first parallel shielding plate, a first perpendicular shielding plate extending away from the magnet in a direction perpendicular to the movement direction connecting a front edge of the first parallel shielding plate and a front edge of the second parallel shielding plate, and a second perpendicular shielding plate extending away from the magnet in the direction perpendicular to the movement direction connecting a rear edge of the first parallel shielding plate and a rear edge of the second parallel shielding plate, and
   a center of the first perpendicular shielding plate and a center of the second perpendicular shielding plate each include a hole in the movement direction.

8. The linear motor device according to claim 7, wherein the hole of the first perpendicular shielding plate is larger than the hole of the second perpendicular shielding plate, and
   the hole of the second perpendicular shielding plate is circumferentially surrounded by a plurality of surround holes.

* * * * *